United States Patent [19]

Nozu et al.

[11] Patent Number: 4,609,925

[45] Date of Patent: Sep. 2, 1986

[54] METHOD FOR REMOVING AIR BUBBLES OR SOLID IMPURITIES FROM THE PRINTING HEAD OF A DROP-ON-DEMAND TYPE INK JET PRINTER

[75] Inventors: Taketo Nozu, Hino; Yoshiaki Kimura, Hachioji; Yasuhiko Tanaka, Fuchu, all of Japan

[73] Assignee: Konishiroku Photo Industry Co., Ltd., Tokyo, Japan

[21] Appl. No.: 696,418

[22] Filed: Jan. 30, 1985

Related U.S. Application Data

[63] Continuation of Ser. No. 452,440, Dec. 23, 1982, abandoned.

[30] Foreign Application Priority Data

| | | | |
|---|---|---|---|
| Dec. 26, 1981 | [JP] | Japan | 56-213896 |
| Dec. 26, 1981 | [JP] | Japan | 56-213897 |
| Dec. 26, 1981 | [JP] | Japan | 56-213900 |
| Feb. 2, 1982 | [JP] | Japan | 57-16082 |

[51] Int. Cl.[4] .......... G01D 15/18

[52] U.S. Cl. .......... 346/1.1; 346/140 R

[58] Field of Search .......... 346/1.1, 75, 140

[56] References Cited

U.S. PATENT DOCUMENTS

| | | | |
|---|---|---|---|
| 4,038,667 | 7/1977 | Hou | 346/140 |
| 4,123,761 | 10/1978 | Kimura | 346/140 |
| 4,144,537 | 3/1979 | Kimura | 346/140 |
| 4,176,363 | 11/1979 | Kasahara | 346/140 |
| 4,245,224 | 1/1981 | Isayama | 346/140 X |
| 4,266,232 | 5/1981 | Juliana | 346/140 |
| 4,314,263 | 2/1982 | Carley | 346/140 |
| 4,323,908 | 4/1982 | Lee | 346/140 |
| 4,364,065 | 12/1982 | Yamamori | 346/140 |
| 4,367,479 | 1/1983 | Bower | 346/140 |
| 4,380,770 | 4/1983 | Maruyama | 346/140 |
| 4,420,764 | 12/1983 | Okada | 346/140 |

OTHER PUBLICATIONS

Gutfeld von, R. J., Anticlogging Ink Jet Nozzle Chamber, IBM Tech. Disc. Bulletin, vol. 17, No. 6, Nov. 1974, p. 1802.

*Primary Examiner*—Joseph W. Hartary

*Attorney, Agent, or Firm*—Finnegan, Henderson, Farabow, Garrett & Dunner

[57] ABSTRACT

An ink jet printer wherein a mechanical vibration is applied by an electromechanical transducer secured to a printing head to the ink in a nozzle and a pressure chamber of the printing head when the ink jet printer is not in a printing operation state, so that an ink flow is formed in the ink passage within the period of time including the mechanical vibrating operation or after the completion of the mechanical vibrating operation. The electromechanical transducer is used when droplets are jetted out. An electromechanical transducer which is brought into contact with the printing head only when the mechanical vibration is generated can be employed. The nozzle can be covered with a liquid within the period of time including the whole of the mechanical vibrating operation.

31 Claims, 24 Drawing Figures

PRIOR ART FIG. 1
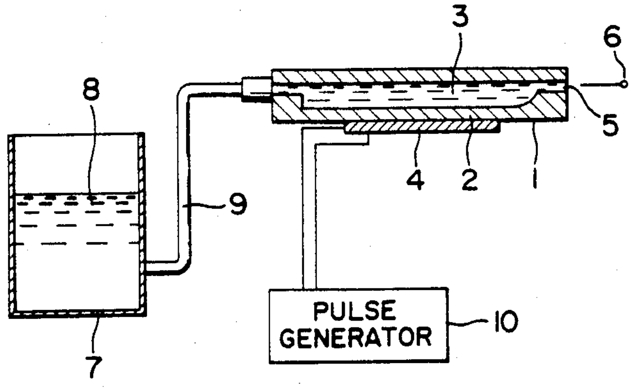
FIG. 2(a)
PRIOR ART
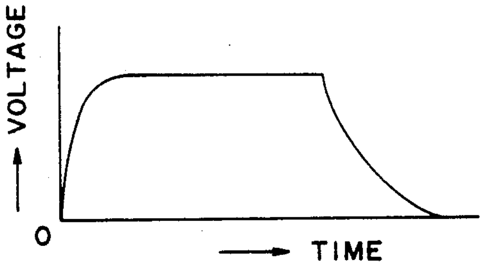
FIG. 2(b)
PRIOR ART
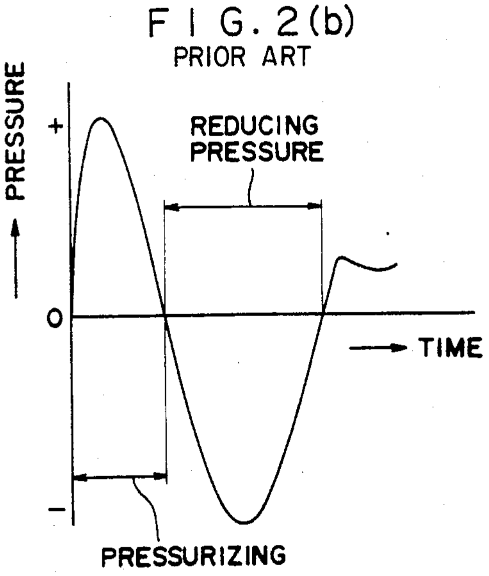

METHOD FOR REMOVING AIR BUBBLES OR SOLID IMPURITIES FROM THE PRINTING HEAD OF A DROP-ON-DEMAND TYPE INK JET PRINTER

This is a continuation, of application Ser. No. 452,440, filed Dec. 23, 1982 now abandoned.

BACKGROUND OF THE INVENTION

1. Field of the Invention:

The present invention relates to an ink jet printer and more particularly to an ink jet printer capable of highly efficiently removing such factors preventing a normal injection and flying of ink droplets as air bubbles or solid matter generated in or having entered into a nozzle or a pressure chamber.

2. Description of the Prior Art:

Several systems have been hitherto devised and put into practice for the printing head of the ink jet printer. For instance, FIG. 1 shows an example of a system called drop-on-demand system in which a nozzle 5 and a pressure chamber 3 are filled with the ink led from an ink storing chamber 7 through a duct 9. When an electric pulse is applied to a piezoelectric transducer 4 from a pulse generator 10, a flexible wall 2 together with the piezoelectric transducer 4 is deflected toward the pressure chamber 3 by means of a piezoelectric effect, so that the pressure chamber 3 suddenly decreases in volume. The sudden decrease in volume causes a liquid pressure to be produced in the pressure chamber 3, and the liquid pressure causes the ink in the pressure chamber 3 to be jetted out as an ink droplet 6 through the nozzle 5. The reduction portion of the ink in the pressure chamber 3 is compensated by ink 8 stored in the ink storing chamber 7 which flows into the pressure chamber 3 through the duct 9.

By the way, there are various kinds of factors which prevent the normal injection and flying of ink droplets. Among them are air bubbles and solid matter present in the nozzle 5 or the pressure chamber 3 which are frequently generated in normal use. In other words, if there are air bubbles in the nozzle 5 or the pressure chamber 3, all or a part of the pressure produced in the pressure chamber 3 is absorbed by the air bubbles, resulting in such abnormalities as incapability of injection of ink droplets, or fluctuation in the flying speed, impossibility of straight flying, and scattering of ink droplets being separated into a large number of smaller droplets as ink droplets are jetted out. Moreover, if there is solid matter in the nozzle 5, the normal injection of ink is prevented, and in the extreme case, the nozzle is clogged, so that it becomes completely impossible to jet out any ink droplets. Although the existence of solid matter in the pressure chamber 3 does not immediately result in an abnormality, this causes clogging sooner or later, bringing about such problems as mentioned above.

The air bubbles and solid matter causing such abnormalities are considered to be generated in the following cases: when an abnormal shock is applied to a printing head 1 during a recording operation or standby of a printer (not shown), so that an air bubble is undesirably drawn in from the nozzle 5; when a noise overlaps with the electric signal applied to the piezoelectric transducer 4 from the pulse generator 10 during a recording operation, thereby to disorder a normal vibration of meniscus of the ink in the nozzle 5, so that an air bubble is undesirably drawn in from the nozzle 5; when the air dissolved in the ink separates out; and when the ambient temperature changes while the printer is in an inoperative state and consequently the ink thermally expands or contracts, so that an air bubble is undesirably drawn in from the nozzle 5. Moreover, solid matter is also generated through drying and setting of the ink in the nozzle 5 when the printing head 1 is left in an inoperative state for a long period of time or the environmental moisture is abnormally low, and solid matter is also generated by the entry into the nozzle 5 of the dust floating in the air or the paper powder generated from the recording paper. In addition, there are also cases where solid matter is included in ink from the first.

In order to remove such air bubbles and solid matter preventing the normal injection and flying of ink from the nozzle 5 of the printing head 1, such a method has been conventionally employed as applying to the ink a washing liquid pressure higher than a constant pressure (the method of applying the washing liquid pressure is not shown) in order to form a forced ink flow in the pressure chamber 3 and the nozzle 5 (e.g., Japanese Patent Laid-Open No. 150030/1977). It is, however, not sufficiently effective in removing air bubbles or solid matter to only form a forced ink flow by thus simply applying a washing liquid pressure. In other words, when air bubbles or solid matter is attached to the wall inside the nozzle 5 or the pressure chamber 3 or when they are present in the vicinity of the wall, the ink flow rate in these places is not sufficient, so that it is often impossible to remove them. Especially, when the printing head 1 is not horizontally held, unlike the one shown in FIG. 1, but obliquely held so that the side of the nozzle 5 is lower than the other, air bubbles tend to move in the opposite direction to the nozzle 5 by means of the buoyancy thereof. In such a case, it is almost impossible to remove the air bubbles.

When air bubbles or solid matter cannot be removed from the pressure chamber 3 or the nozzle 5 as described above, there is hitherto such a problem that an expensive ink is uselessly made to flow out, since it is necessary to repeat the operation of forming an ink flow many times. When the printing head 1 is not restored to normal on the printer, the printing head is regarded as defective, and it is necessary to refill ink after the printing head 1 is removed from the printer. In the extreme case, the expensive printing head 1 is abandoned as defective.

Moreover, in order to remove such air bubbles and solid matter preventing the normal injection of ink into nozzle 5 and normal ejection of the ink from the nozzle 5 of the printing head 1, a washing liquid pressure higher than a constant pressure is applied to the ink thereby to form a forced ink flow in the pressure chamber 3 and the nozzle 5. Moreover, if such a method is employed as applying a pulse voltage as shown in FIG. 2(*a*) to, for example, the piezoelectric transducer secured to the printing head 1 for providing a mechanical vibration, the air bubbles and solid matter attached to the walls inside the pressure chamber 3 and the nozzle 5 are also supplied with the energy for separation and are separated from the walls as well as removed to the outside of the nozzle 5 together with the turbulent ink flow. The efficiency of removing the air bubbles and the solid matter is, however, not necessarily high in the case of only applying a washing liquid pressure in order to form a forced ink flow as well as applying a mechanical vibration to the inside of the pressure chamber 3. In other words, as shown in FIG. 2(*b*), although the mechanical vibration permits the ink in the pressure chamber 3 to be pressurized or reduced in pressure, if a mechanical vibration having the same magnitude as that in printing is applied, the air bubbles increase in both volume and number since the reduction in pressure is too large. Consequently, the injection of ink droplets becomes abnormal.

Such a phenomenon is generally called cavitation. Also when solid matter is present in the ink, the solid matter often has minute air bubbles attached thereto. Therefore, the air bubbles also increase and aggravate the trouble.

Moreover, in case of only thus applying a washing liquid pressure is applied in order to form a forced ink flow and a mechanical vibration is also applied to the inside of the pressure chamber 3, the air bubbles or solid particles are removed and at the same time a new air bubble is drawn into the pressure chamber 3 from the nozzle 5. As a result, the overall removal efficiency is not raised very high. The reason why a new air bubble is drawn in may be considered as follows.

FIG. 3(*a*) shows the ink meniscus in the nozzle 5 after an ink droplet is ejected out in a recording operation. A reference numeral 5*a* shows the meniscus in the most convex state, while a reference numeral 5*b* shows the same in the most concave state. The ink meniscus vibrates while reciprocating between the positions 5*a* and 5*b* in accordance with the change in pressure in the pressure chamber 3. The reason why the meniscus does not further enter into the pressure chamber 3 when reaching the position 5*b* is that the reduction in pressure in the pressure chamber 3 is small or that the surface tension of the ink is large. When the reduction in pressure in the pressure chamber 3 is large or the ink surface tension is small, the ink meniscus is constricted at a position 5*c*, as shown in FIG. 3(*b*), and an air bubble is finally formed.

By the way, when the ink is being discharged from the nozzle 5 by applying a washing liquid pressure thereto, a nozzle surface 11 is covered with a thin ink film, as shown in FIG. 3(*c*). If a mechanical vibration is applied to the inside of the pressure chamber 3 while the nozzle surface 11 is thus covered with the thin ink film, the constriction 5*c* of the ink meniscus is produced at a position very close to the tip of the nozzle, since the nozzle diameter is small, i.e., less than 100 microns, so that an air bubble is formed and drawn into the pressure chamber 3, as shown in FIG. 3(*d*).

Thus, the overall removal efficiency is hitherto low, since air bubbles or solid matter is removed from the nozzle 5 and at the same time, a new air bubble is formed inside the nozzle 5 and drawn into the pressure chamber 3.

SUMMARY OF THE INVENTION

It is, therefore, an object of the present invention to provide a new method for removing air bubbles or solid matter preventing normal injection of ink into nozzle 5 and normal ejection of the ink from the nozzle 5 of the printing head 1, which is high in efficiency, low in cost, simple and easy to perform, thereby to improve the prior art in each of these areas.

The present invention has the following main points: (1) a mechanical vibration is applied to an ink passage including the nozzle and the pressure chamber of the printing head when the ink jet printer head is set at a purging position; (2) heat is applied to the printing head so that the temperature of the ink in the printing head is raised; (3) a forced ink flow is formed in the ink passage within the period of time including the mechanical vibration operation or after the completion of the same; (4) an electromechanical transducer means secured to the printing head is employed as a means for generating the mechanical vibration; (5) an electromechanical transducer means is used for injecting droplets and is employed as a means for generating the mechanical vibration; and (6) an electromechanical transducer means which is brought into contact with the printing head only when the mechanical vibration is generated is employed as a means for generating the mechanical vibration.

Another object of the present invention is to provide a method for removing air bubbles or solid impurities from a printing head of a drop-on-demand type ink jet printer, the method including applying a mechanical vibration to an ink passage including the nozzle and the pressure chamber of the printing head of the printer when it is not in a recording operation state and moreover forming a forced ink flow in the ink passage within the period of time including the mechanical vibration operation or after the mechanical vibration operation, wherein the magnitude of the mechanical vibration is made smaller than that of the mechanical vibration generated in the pressure chamber during the printing operation.

Still another object of the present invention is to provide a method such that a mechanical vibration is applied to an ink passage including the nozzle and the pressure chamber of the printing head of the printer when it is not in a printing operation state and moreover a forced ink flow is formed in the ink passage within the period of time including the mechanical vibration operation or after the mechanical vibration operation, characterized in that: (1) a nozzle surface including the tip of the nozzle is covered with a liquid ink layer within the period of time including the whole of the mechanical vibration operation, the liquid contacting with a solid surface facing the nozzle; (2) a nozzle cap for preventing clogging of the nozzle is employed as the solid surface; (3) the nozzle surface including the tip of the nozzle is covered with a liquid ink layer having a thickness larger than the length of the nozzle within the period of time including the whole of the mechanical vibration operation; and (4) the ink flowing out from the nozzle is employed as the liquid ink layer.

A further object of the present invention is to provide a method of removing the air bubbles in the nozzle or clogging thereof with a remarkably high efficiency, by combining according to a proper sequence both heating of an ink passage including the nozzle to a high temperature and application of a mechanical vibration thereto and simultaneously carrying out both when the printer is not in a printing operation state.

Other objects and features of the present invention will be apparent from the following description taken in conjunction with the accompanying drawings.

DESCRIPTION OF THE DRAWINGS

FIG. 1 illustrates a conventional printing head;

FIG. 2(*a*) illustrates a drive pulse applied to a piezoelectric element;

FIG. 2(*b*) illustrates the fluctuation in pressure in a pressure chamber;

DESCRIPTION OF THE PREFERRED EMBODIMENTS

Figure 3A:
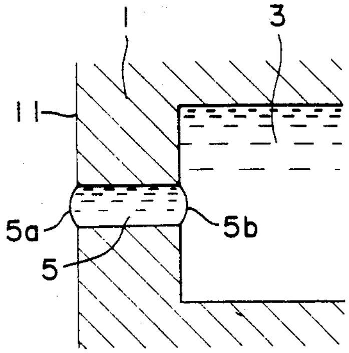
FIG. 3(a) PRIOR ART
FIG. 3(*a*) thru FIG. 3(*e*) illustrate how an air bubble is drawn in from a nozzle.
Figure 3B:
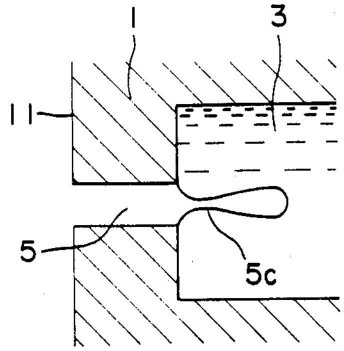
FIG. 3(b) PRIOR ART
Figure 3C:
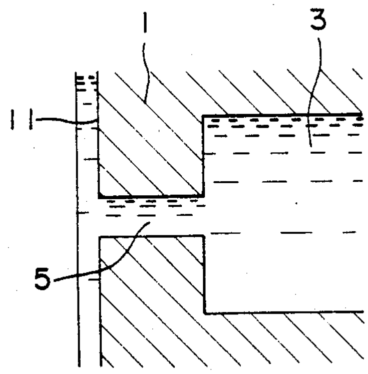
FIG. 3(c) PRIOR ART
Figure 3D:
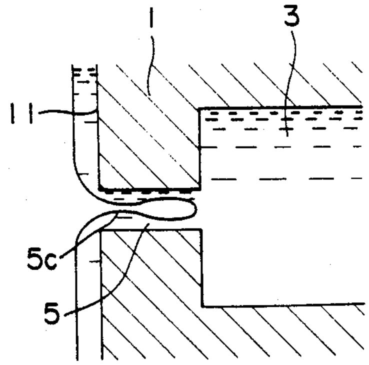
FIG. 3(d) PRIOR ART
Figure 3E:
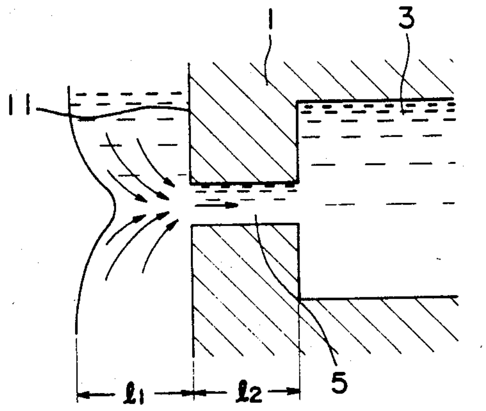
F I G. 3(e) PRIOR ART
Figure 4:
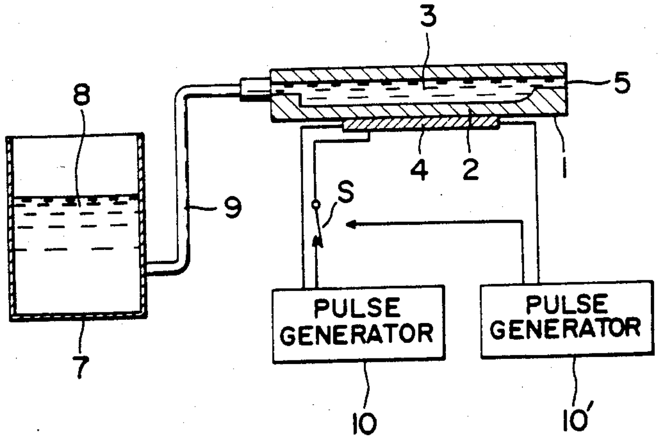
FIG. 4 illustrates a printing head pertaining to one preferred embodiment of an ink jet printer according to the present invention.

FIG. 4 shows one preferred embodiment of the present invention. Namely, the piezoelectric transducer used for producing ink droplets in a normal printing operation is employed as a means for generating a mechanical vibration in the ink passage.

The operation of removing air bubbles or solid matter will be practically described hereinunder. First, when such an abnormality is discovered during a recording operation of the printer through a visual observation or some means detecting that no ink droplet is ejected from the nozzle 5, that the ejection direction or speed is abnormal although ink droplets are ejected, or that each ink droplet is ejected in separated pieces, the printer shifts to an operation for removing air bubbles (the operation will be referred to as the "purging operation" hereinafter). In the purging operation, first, a pressure is applied to the ink storing chamber 7 by a pressure applying means (not shown) so that ink is made to flow into the printing head 1 and forcibly discharged to overflow from the nozzle 5. At the point of time the ink starts overflowing from the nozzle 5, an electric pulse is applied to the piezoelectric transducer 4 from a pulse generator 10′ by changing over a switch S. Consequently, the flexible wall 2, together with the piezoelectric transducer 4, is vibrated toward the pressure chamber 3 by means of a piezoelectric effect. In this case, an electric pulse having the same shape as the electric pulse applied to the piezoelectric transducer 4 in the recording operation is employed. However, an electric pulse having a different shape may be used. This operation permits the air bubbles or solid matter in the pressure chamber 3 to flow out to the outside of the nozzle 5 together with the ink discharged, so that the printing head 1 can return to the normal printing operation.

There is less than 10% probability that the printing head air bubbles or solid matter having in the nozzle is restored to normal after the ink is discharged for, e.g., 5 seconds according to the conventional method. The restoring percentage is only about 30% even if the ink discharge time is extended so that the ink is discharged for 30 seconds. However, it has been confirmed that when the ink is discharged for 5 seconds while the pressure chamber 3 is being mechanically vibrated by employing the present invention, about 50% of the defective nozzles are restored to a normal state. Moreover, the restoring percentage is raised to substantially 100% by repeating the purging while vibrating the pressure chamber 3.

It is believed that the reason why the efficiency of removing the air bubbles or solid matter is thus raised by not only simply discharging the ink from the nozzle but also applying the mechanical vibration to the inside of the pressure chamber 3 at the same time in removing the air bubbles or solid matter in the pressure chamber or the nozzle is that the flow pattern of the ink in the pressure chamber 3 and the nozzle 5 differs according to whether or not a mechanical vibration is applied to the inside of the pressure chamber 3. In other words, the flow of the ink when no mechanical vibration is applied to the inside of the pressure chamber 3 is a laminar flow, since the ink flow rate is relatively gentle. In this case, the flow rates near the wall surfaces inside the pressure chamber 3 and the nozzle 5 are substantially zero. Therefore, it is impossible to remove the air bubbles or solid matter attached to the wall surfaces. On the other hand, when a mechanical vibration is applied to the inside of the pressure chamber 3, the flow of the ink becomes a turbulent flow, so that considerably high flow rates are obtained even near the wall surfaces inside the pressure chamber 3 and the nozzle 5. Also the air bubbles or solid matter attached to the wall surfaces of the pressure chamber 3 and the nozzle 5 are supplied with energy for separation through the reception of the mechanical vibration and then separated. Thus, it is possible to easily remove the air bubbles or solid matter attached to the wall surfaces.

Figure 5:
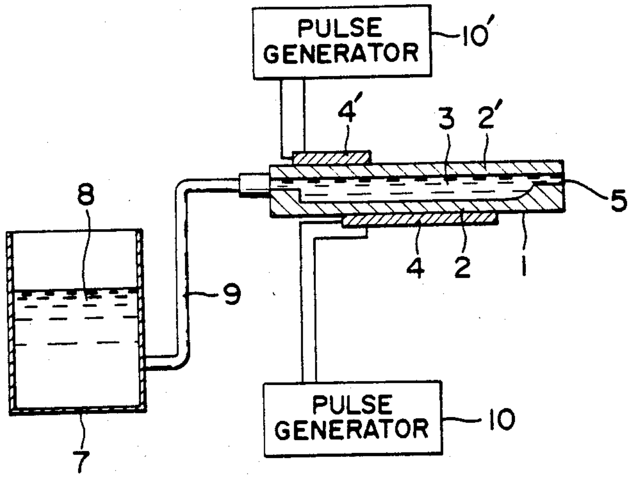
FIG. 5 illustrates another preferred embodiment of the present invention.

FIG. 5 shows another preferred embodiment of the present invention, employing as the means for generating a mechanical vibration an electromechanical transducer means 4′, secured to the printing head, other than the electromechanical transducer means used for generating ink droplets in the normal printing operation. Also in this case, when the purging operation is conducted according to the procedure described in conjunction with FIG. 4, it is possible to obtain the effect completely the same as the case of FIG. 4.

Figure 6:
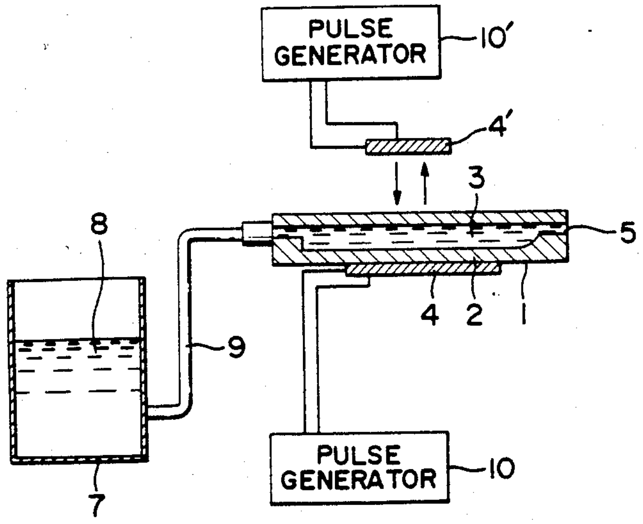
FIG. 6 illustrates still another preferred embodiment of the present invention.

FIG. 6 shows still another preferred embodiment of the present invention. In this case, an electromechanical transducer means, which is not on the printing head 1, is employed as the means for generating a mechanical vibration. When the printing head 1 shifts to the purging operation, the printing head 1 and the electromechanical transducer means 4′ are brought into contact with each other, and the electromechanical transducer means 4′ brings the same effect on the printing head 1 as the piezoelectric transducer 4 in FIG. 4. As the method for contacting the electromechanical transducer means 4′ and the printing head 1 with each other, it is possible to employ for completion of the contact either the method wherein the printing head 1 moves to the fixed electomechanical transducer means 4′ or the method wherein to the contrary, the electromechanical transducer means 4′ moves to the fixed printing head 1.

In FIGS. 5 and 6, the shape and size of the electric pulse applied to the electomechanical transducer means should be selected so that the electromechanical transducer means 4' can show the same effect as that of the piezoelectric transducer 4 in the preferred embodiment shown in FIG. 4.

It is preferable to employ a piezoelectric transducer, magnetostrictive vibrator, horn, etc. as the electromechanical transducer means 4' in FIGS. 4 and 5. As the piezoelectric transducer, for example, PZT-5H manufactured by Panatron of the U.S.A. is effective.

As will be fully understood from the foregoing description, according to the present invention, it is possible to remove with a high efficiency the air bubbles or solid matter generated in or having entered into the pressure chamber or the nozzle of the printing head of the ink jet printer.

Figure 7A:
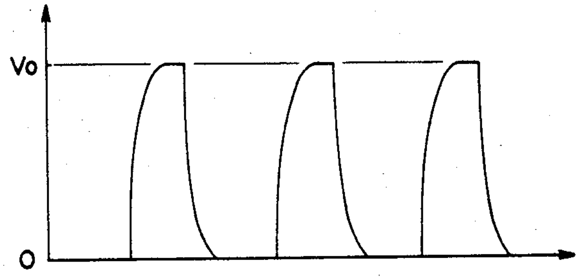
FIG. 7(*a*) and FIG. 7(*b*) illustrate piezoelectric element driving pulses respectively.
Figure 7B:
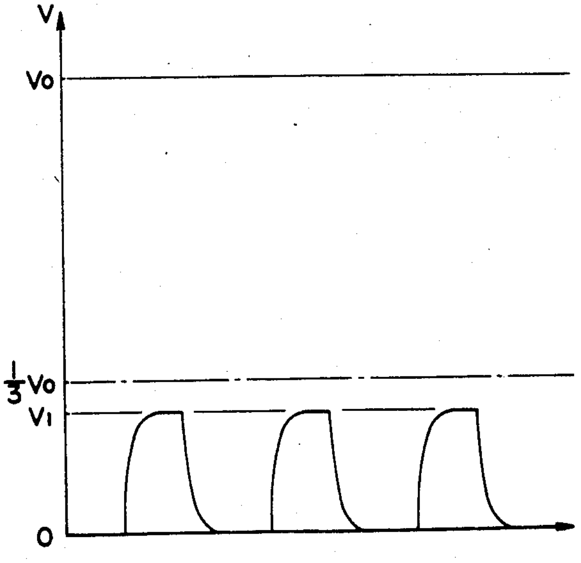
Figure 8:
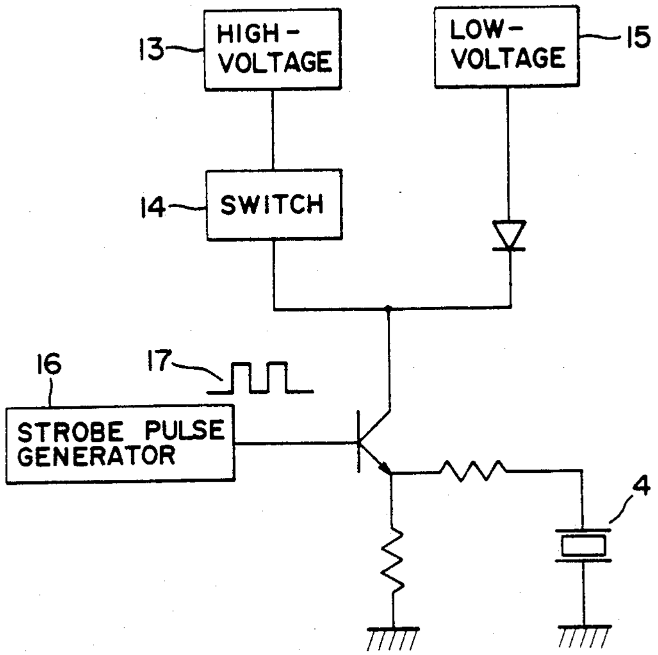
FIG. 8 illustrates a circuit for switching over the driving pulses to each other.

According to a further preferred embodiment of the present invention, in the printing head shown in FIG. 5, a drive pulse $V_0$, shown in FIG. 7(*a*), which is applied to the piezoelectric transducer 4' in the printing operation of the printer is made larger than a drive pulse $V_1$, shown in FIG. 7(*b*), which is applied when the printer is not in a printing operation state, i.e., $V_0 > V_1$. FIG. 8 shows an example of a circuit for switching over the drive pulse applied to the piezoelectric transducer 4' in the printing operation and the drive pulse applied to the piezoelectric element 4' when the printer is not in a printing operation state. In this preferred embodiment, when the printer enters into the purging operation, a pressure is applied to the ink storing chamber 7 by the pressure applying means (not shown) so that the ink is made to flow into the printing head 1 and forcibly discharged to overflow from the nozzle 5. A switch means 14 turns OFF at the point of time when the ink starts overflowing from the nozzle 5. At the same time, a strobe pulse 17 is generated in a strobe pulse generator 16, so that the drive pulse shown in FIG. 7(*b*) is applied to the piezoelectric element 4'. In this case, the driving frequency is made to coincide with the frequency of the electric pulse applied to the piezoelectric transducer 4 during the printing operation. It is, however, possible to employ a different value according to the circumstances. The flexible wall 2, together with the piezoelectric transducer 4', is vibrated toward the pressure chamber 3 by means of a piezoelectric effect, and this movement permits the air bubbles or solid matter present in the pressure chamber 3 or the nozzle 5 to flow out to the outside of the nozzle 5 together with the ink. When the purging operation is completed, the switch means 14 turns ON, and when the subsequent printing operation is started, the drive pulse shown in FIG. 7(*a*) is applied to the piezoelectric transducer 4', so that a normal printing operation is made possible. A reference numeral 13 designates a high-voltage power source, while a reference numeral 15 denotes a low-voltage power source.

It has been confirmed that if the printing head having air bubbles or a nozzle clogged with solid matter is made to discharge the ink for 5 seconds while the pressure chamber 3 is being mechanically vibrated by employing the method according to the present invention, about 70% of the defective nozzles are restored to normal. Moreover, the restoring percentage is raised to substantially 100% by repeating the purging while vibrating the pressure chamber 3.

The reason why the efficiency of removing the air bubbles or solid matter is thus raised by applying to the inside of the pressure chamber 3 a mechanical vibration smaller than that in the printing operation while discharging the ink is that there is no possibility that the air bubbles increase in volume or a new air bubble is generated by taking the air bubbles or the air bubbles attached to the solid matter as a nucleus. In other words, when a mechanical vibration having the same magnitude as that in the printing operation is applied to the inside of the pressure chamber 3, a part of the air bubbles and solid matter attached to the walls of the pressure chamber 3 and the nozzle 5 are supplied with energy for separation and then separated from the walls as well as discharged to the outside of the nozzle 5 together with the turbulent ink flow. In this case, however, since the mechanical vibration is too large, some of the air bubbles increase in both volume and number when the pressure is reduced and remain in the pressure chamber 3 and the nozzle 5, so that the overall removal efficiency is not raised very high. By decreasing the magnitude of the mechanical vibration, such increase of the air bubbles is prevented, and consequently, it is possible to raise the efficiency of removing the air bubbles or the solid matter.

A phenomenon in which air bubbles are generated or increased in a liquid when the pressure is reduced is generally called cavitation. The generation of cavitation is affected by the physical properties (evaporation characteristics, surface tension, viscosity, etc.) of the liquid, the substance dissolved in the liquid, the substance floating in the liquid, etc. Therefore, it is difficult to unconditionally prescribe a maximum voltage $V_1$ of the drive pulse (FIG. 7(*b*)) applied to the piezoelectric element 4' according to the present invention. However, it has been confirmed that an excellent result can be obtained when the maximum voltage $V_1$ is set with respect to a maximum voltage $V_0$ of the drive pulse (FIG. 7(*a*)) applied during the printing operation according to the relation $V_1 \leqq V_0$.

Although in the foregoing description the piezoelectric transducer 4' is employed for applying a mechanical vibration to the inside of the pressure chamber 3, the piezoelectric transducer 4, shown in FIG. 4, used in the printing operation may be employed as an alternative. In this case, the printing pulse generator 10 is changed over to a purging pulse generator 10' by means of a switch 18.

In a still further preferred embodiment of the present invention, the surface of the liquid layer covering a nozzle surface 11 which contacts with the outside air is covered with a solid member within the period of time including the whole of the mechanical vibrating operation in order to eliminate the existence of the air which may be drawn into the nozzle 5. Moreover, another method may be employed so that the liquid layer covering the nozzle surface 11 is made thicker so that no air bubble is drawn into the pressure chamber 3. The latter will be practically described hereinunder. As described above, the reason why an air bubble is formed at the tip of the nozzle is either that the reduction in pressure in the pressure chamber 3 is large or that the surface tension of the ink is small, but directly, the air bubble is formed because the constriction 5*c* of the ink meniscus is formed. Therefore, it suffices for preventing formation of any air bubble to eliminate the constriction 5*c* of the ink meniscus. It is effective therefore to cover the nozzle 5 with a thick ink layer. When the ink layer is thick, the ink meniscus has no constriction, since the ink flows into the nozzle 5 from not only the front surface of the nozzle but also the periphery thereof when the pressure in the pressure chamber 3 is reduced, as shown in FIG. 3(*e*). Although it is difficult to unconditionally determine the thickness of the ink layer for preventing the formation of the constriction of the ink meniscus, since it is affected by the pressure in the pressure chamber 3 and the ink surface tension, etc., it has been confirmed that the thickness required is at least not less than the length of the nozzle. In other words, it is necessary for $l_1 \geqq l_2$ in FIG. 3(*e*).

As described above, by shutting off the liquid layer covering the nozzle surface 11 from the outside air, or by making the thickness of the liquid covering the nozzle surface 11 larger than the nozzle length, there is completely no possibility that any air bubble can be drawn into the pressure chamber 3. Consequently, it is possible to raise the efficiency of removing air bubbles from the pressure chamber 3 and the nozzle 5.

Figure 9:
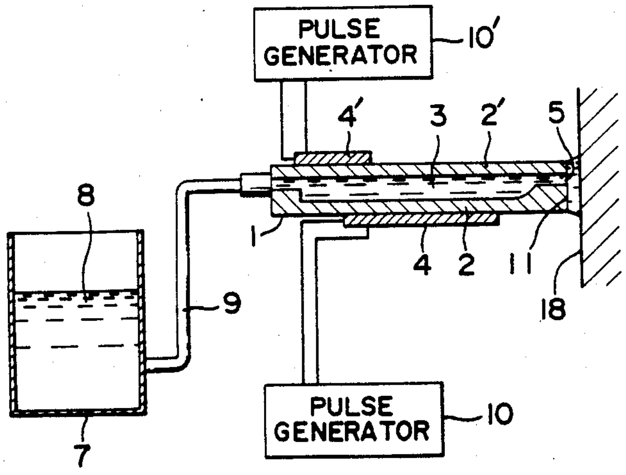
FIG. 9 thru FIG. 11 illustrate further preferred embodiments of the present invention respectively.

FIG. 9 shows the nozzle surface being covered with a liquid according to the present invention. First, the printer shifts to the purging operation when such abnormalities are discovered through visual observation or some means of detecting during the printing operation of the printer that no ink droplet is ejected from the nozzle 5, that the ejection direction or speed is abnormal although ink droplets are being ejected, or that each ink droplet is ejected as separated pieces. In the purging operation, first, a pressure is applied to the ink storing chamber by the pressure applying means (not shown) so that the ink is made to flow into the printing head 1 and forcibly discharged to overflow from the nozzle 5. Although the ink having overflown is initially held between the nozzle surface 11 and an opposing surface 18 and then falls along the opposing surface 18, the ink is continuously present in a small space formed between the nozzle surface 11 and the opposing surface 18, so that there is no possibility of the existence of air at the front surface of the nozzle 5.

When an electric pulse is applied to the piezoelectric transducer 4′ from the pulse generator 10′ at the point of time air is thus shut off from the front surface of the nozzle 5, a flexible wall 2′, together with the piezoelectric transducer 4′, is vibrated toward the pressure chamber 3 by means of a piezoelectric effect. In this case, the electric pulse applied to the piezoelectric transducer 4 in the printing operation is employed as the electric pulse. This operation prevents a new air bubble from being drawn into the pressure chamber 3 and the nozzle 5. Moreover, the air bubbles or solid matter in the pressure chamber 3 or the nozzle 5 is made to flow out to the outside of the nozzle 5 together with the discharged ink. As a result, the printing head can return to a normal printing operation.

It has been confirmed that if the printing head having air bubbles or solid matter having entered into the nozzle is made to discharge the ink for 5 seconds while the pressure chamber 3 is being mechanically vibrated by employing the method according to the present invention, about 70–80% of the defective nozzles are restored to normal. Moreover, the restoring percentage is raised to substantially 100% by repeating the purging while vibrating the pressure chamber 3.

Figure 10:
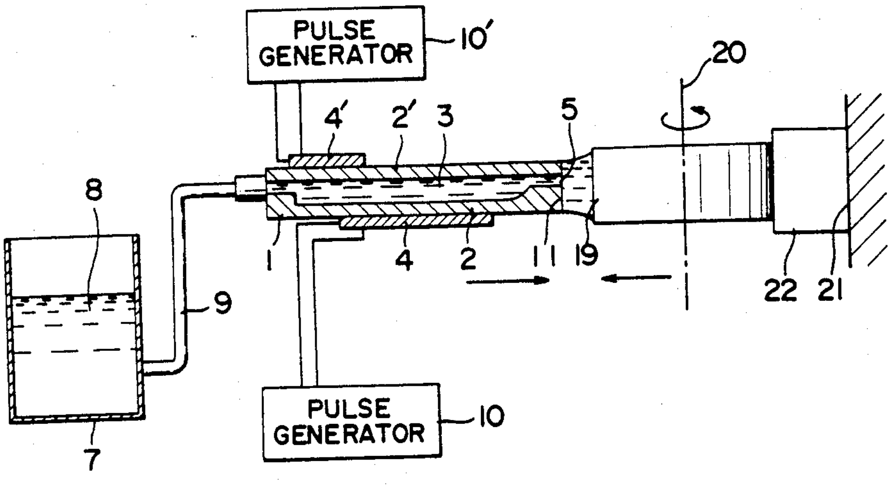

FIG. 10 shows a still further preferred embodiment of the present invention, employing instead of the opposing surface 18 a nozzle cap 19 (e.g., described in Japanese Patent Laid-Open No. 150033/1977) for preventing clogging of the nozzle 5. The nozzle cap 19 comprises an elastic material with chemical resistance and wear resistance, e.g., urethane rubber, held by means of a metal core, and the surface thereof is maintained clean by means of a blade 22 secured to a wall 21 by the rotation of the cap 19 about its axis 20 in the direction of the arrow in FIG. 10. When necessary, the printing head 1 and the axis 20 approach each other so that the nozzle cap 19 covers the nozzle 5 in order to prevent clogging of the nozzle 5. Since in normal operation the nozzle surface 11 and the nozzle cap 19 are disposed 0.5–1.0 mm away from each other, a small space between the nozzle surface 11 and the nozzle cap 19 can be easily filled with ink. Accordingly, it is possible to completely shut off air from the front surface of the nozzle 5, so that air bubbles are easily discharged to the outside of the nozzle 5 by discharging the ink as well as applying a mechanical vibration to the pressure chamber 3.

Figure 11:
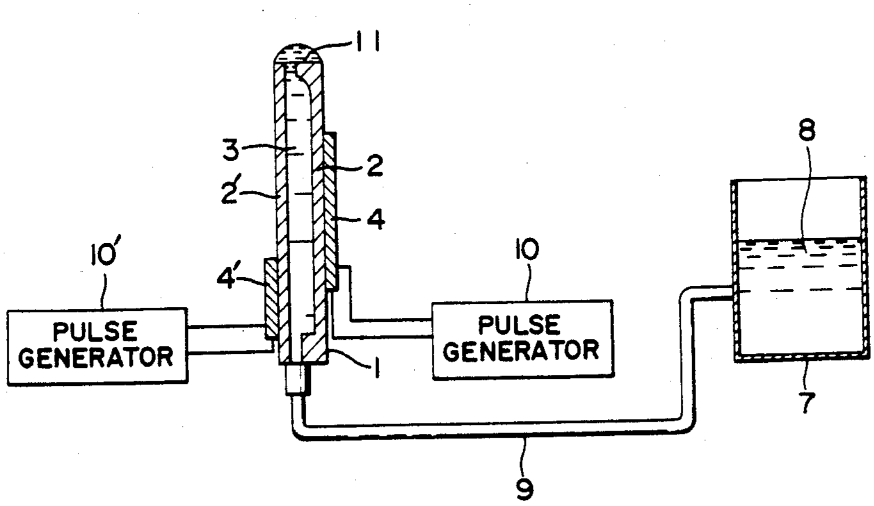

FIG. 11 shows a still further preferred embodiment of the present invention, enabling the nozzle surface 11 to be covered with an ink layer having a thickness larger than the length of the nozzle by maintaining the nozzle surface 11 horizontal, the relation between the ink thickness $l_1$ and the nozzle length $l_2$ being $l_1 \geqq l_2$. By employing such a method, it is possible to obtain the same effect as that described in the above preferred embodiments, and moreover, the air bubbles in the pressure chamber 3 or the nozzle 5 rise in the ink by means of buoyancy and are further easily discharged to the outside of the nozzle 5.

Figure 12:
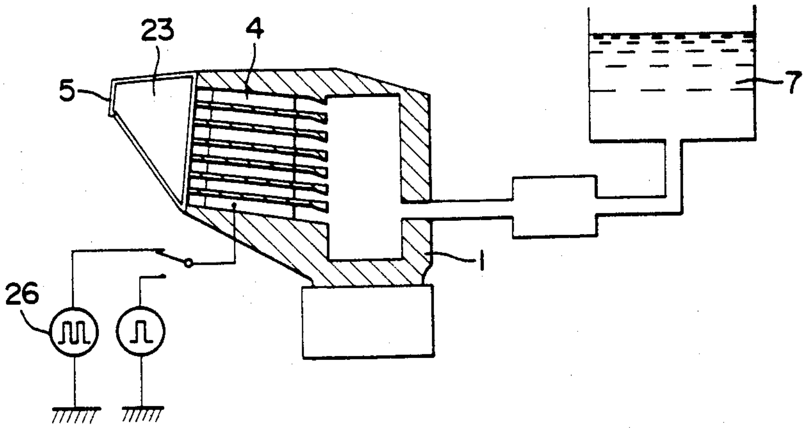
FIG. 12 illustrates a printing head in a still further preferred embodiment of the present invention.

FIG. 12 shows a still further preferred embodiment of the present invention, wherein a heater 23 is mounted on a portion of the nozzle 5 of the printing head.

Figure 13:
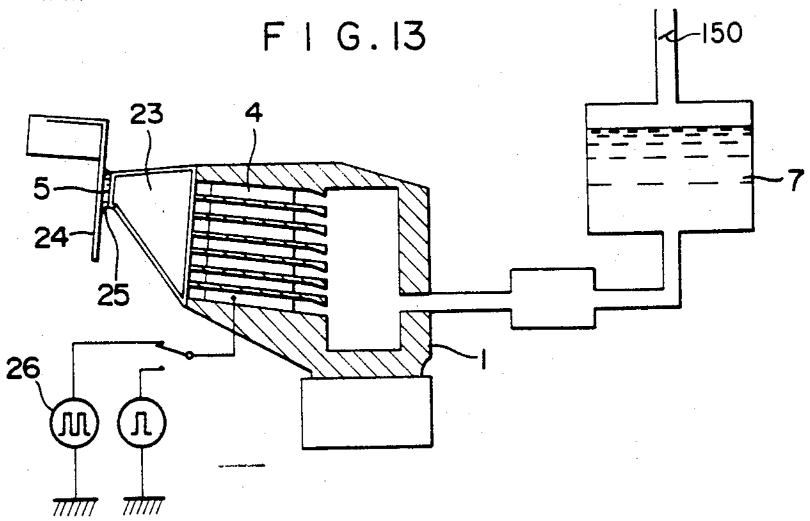
FIG. 13 shows a still further preferred embodiment of the present invention.

The operation of removing air bubbles and clogging according to the present invention will be described hereinunder. In the purging operation, first, the heater 23 is operated to heat the nozzle 5 and the head components in the periphery thereof as well as the ink. At the point in time the that the nozzle and vicinity are heated up to a given temperature, a pressure is applied from an ink tank 7 by opening a pressure valve 150 to apply pressure to tank 7 so that the ink is made to flow into the printing head and be forcibly discharged to overflow from the nozzle. In this case, disposed close to the nozzle surface is a screen 24 (the screen can also serve as the cap for closing the nozzle when the printer is not used) so that the nozzle surface is covered with the ink 25 overflow, as shown in FIG. 13. At the point of time the nozzle surface is sufficiently covered with the ink 25, a drive signal having a higher frequency than that used for printing is applied to the piezoelectric transducer 4 from a high-frequency power source 26 in order to excite the ink and the head components. The nozzle surface is covered with the ink to prevent the intrusion of air bubbles due to the excitation. In this case, the same piezoelectric transducer can be used to provide the drive signal as the transducer used in printing. The heating and exciting operations are carried out for a given period of time to complete the purging operation.

By these operations, the air bubbles or clogging matter is expelled from the nozzle together with the discharged ink, so that the printing head can return to a normal printing operation.

Figure 15:
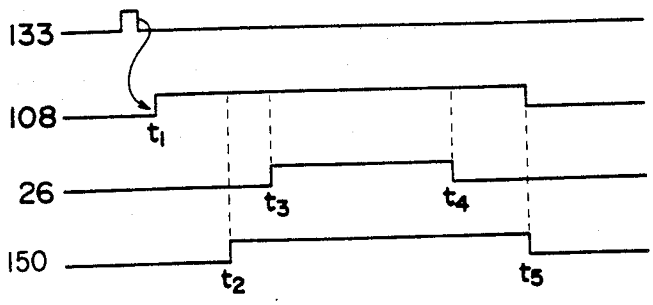
FIG. 15 shows the operation timing of each of various parts in the preferred embodiment shown in FIG. 14.

The above purging operation will be described hereinunder in conjunction with FIGS. 14 and 15.

Figure 14:
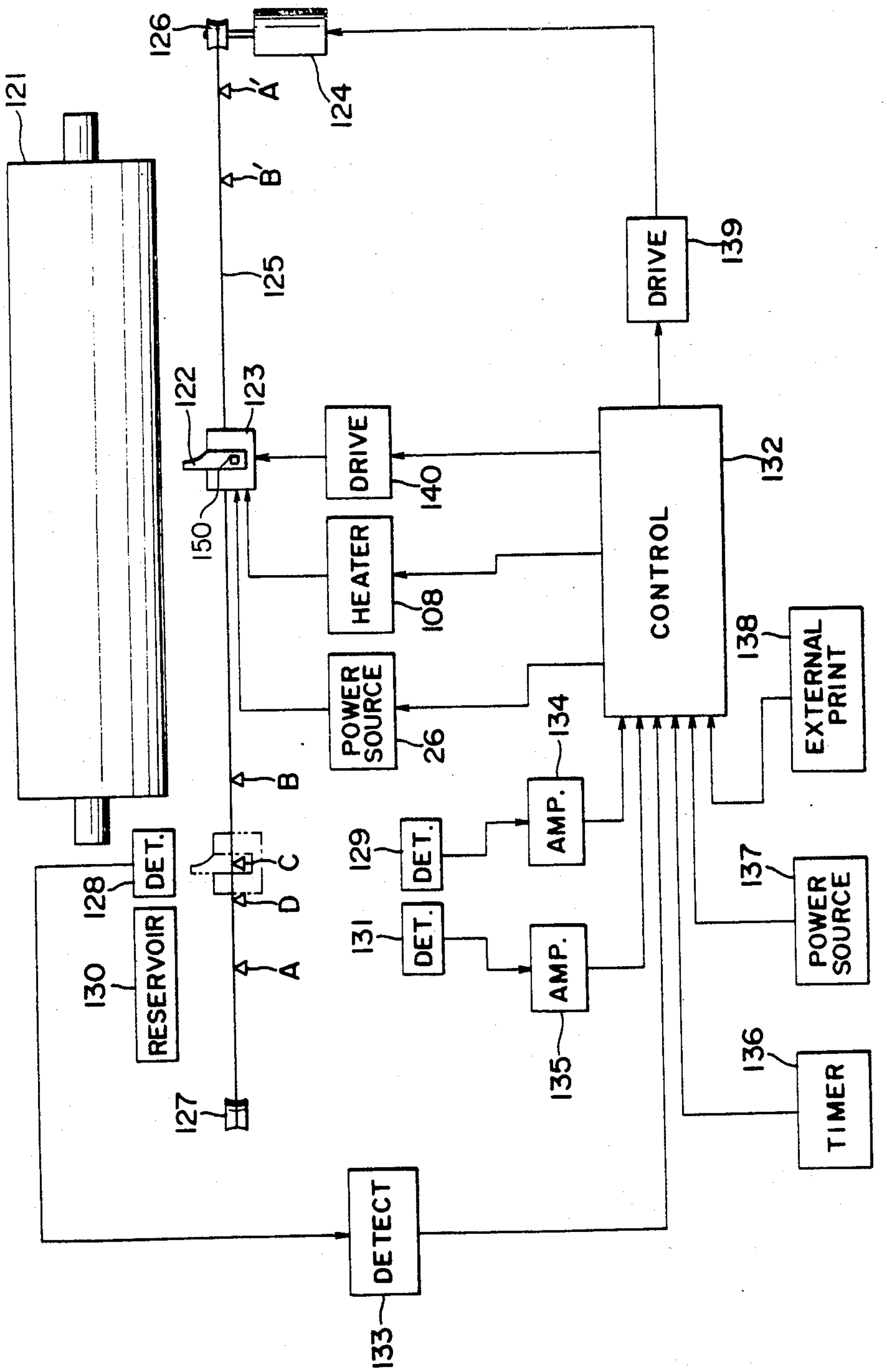
FIG. 14 shows a control system in one preferred embodiment of the present invention.

FIG. 14 shows an arrangement of one preferred embodiment of an on-demand type ink jet printer according to the present invention. Printing is effected on a printing paper 121 on a platen by means of ink particles ejected from a printing head 122. The printing head 122, which has a plurality of nozzles, is mounted on a carriage 123. The carriage 123 is mounted on a transfer belt 125, which is stretched between a drive pulley 126 fitted onto the output shaft of a pulse motor 124 and a tension pulley 127. This arrangement permits the printing head 122 to move within a section AA'. A section BB' in the section AA' is a section where the printing head 122 travels while facing the printing paper, and a position C is a spit position where the printing head 122 subsequently ejects ink particles with respect to the whole channels in order to detect a channel mistake. A position D is a purging position for forcibly discharging ink when there is a channel mistake. Disposed near the spit position C are a channel mistake detector 128 as mentioned in Japanese Patent Laid-Open No. 144977/1981 and 144975/1981, for example, and a position detector 129 for detecting the fact that the printing head 122 is at the spit position C. On the other hand, disposed near the purging position D are an ink reservoir 130 for receiving the ink discharged from the nozzles and a position detector 131 for detecting the fact that the printing head 122 is at the purging position. A microswitch, photoelectric detector, magnetic detector or the like is employed as each of the position detectors 129 and 131.

A control section 132 for effecting various kinds of control receives output signals from each of a detecting circuit 133 for processing the signal from the channel mistake detector 128, an amplifier 134 for amplifying the output signal of the position detector 129, an amplifier 135 for amplifying the output signal of the position detector 131, a timer 136, a power source switch 137, an external print command section 138, etc. and delivers control signals according to a given sequence to each of a motor driving section 139, a head driving section 140, etc.

The ink jet printer shown in FIG. 14 makes the printing head 122 scan under the control by the control section 132 for performing the printing operation. In this case, the control section 132 periodically (e.g., 90 seconds) moves the printing head 122 to the spit position C. At the spit position, whether there is a channel mistake or not is detected. When there is no channel mistake, the printer returns to the printing operation. When there is a channel mistake, the control section 132 moves the printing head 122 to the purging position D in response to a signal from the detecting circuit 133. On the other hand, when a channel mistake is detected, the control section 132 starts the heater 108 and the high-frequency power source 26 for excitation in order to effect the purging operation. FIG. 15 shows an example of the operation timing of each of various portions of the printing operation.

When there is a channel mistake, the heater 108 is started according to a signal from the detecting circuit 133. After a given period of time $(t_2-t_1)$ passes after the starting of the heater 108, a valve 150 provided in the ink supply passage is opened in order to apply pressure to the ink in the printing head, so that the ink is discharged from the nozzle 5. After a given period of time $(t_3-t_1)$ further passes, the high-frequency power source 26 is started in order to apply a mechanical vibration to the head. The heater, the high-frequency power source and the valve are operated for given periods of time $(t_5-t_1, t_4-t_3, t_5-t_2)$ respectively to complete the purging operation. Upon the completion of the purging operation, the head 122 returns to the position C, and the channel mistake detecting operation is performed.

When there is no channel mistake, the head 122 shifts to the printing operation. If a channel mistake is detected, the purging operation is performed again.

It is not always necessary in the purging operation to make the working periods of time of the heater 108 and the high-frequency power source 26 coincide with each other. It is, however, possible to improve the purging efficiency by making the working periods of time of both at least partially overlap each other.

Although it is possible to effect an ink flow to be formed in the printing head by opening the valve after the completion of the operations of the heater and the high-frequency power source, the purging effect is enhanced by also making the working period of time of the valve and those of the heater and the high-frequency power source at least partially overlap each other.

The application of a mechanical vibration to the ink in the printing head 122 is an extremely effective means for improving the purging efficiency. In this case, it is possible to further improve the purging efficiency by variously changing the vibrational characteristics of the mechanical vibration. In other words, it becomes possible to improve the purging efficiency by employing as the high-frequency power source 26 a driving circuit having a frequency, amplitude, pulse width, rising constant and decaying constant which are variable.

Figure 16:
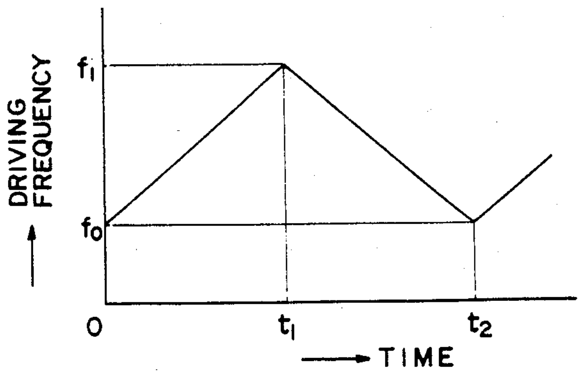
FIG. 16(*a*) and FIG. 16(*b*) show the frequency of a driving wave for excitation employed in the present invention.
Figure 16:
Figure 17:
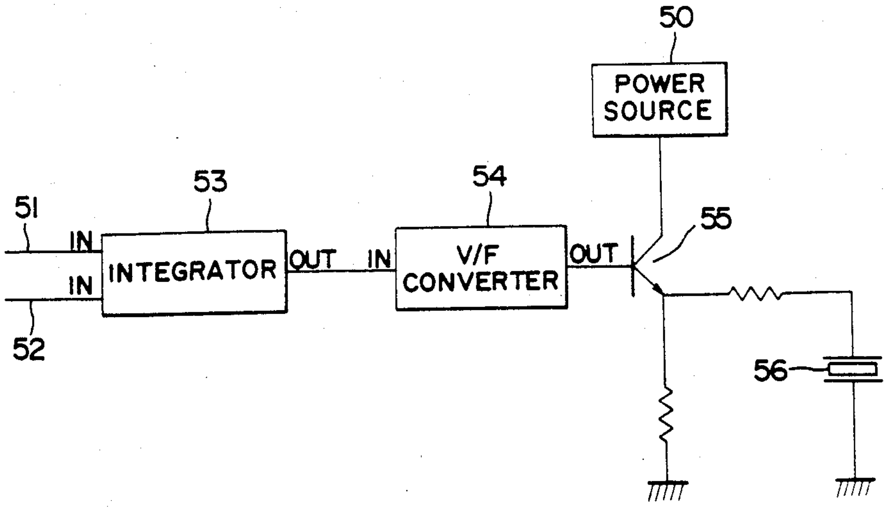
FIG. 17 shows a circuit for generating a driving wave having the frequency shown in FIG. 16(*a*) and FIG. 16(*b*).

The above-mentioned characteristics of the driving wave can be obtained by a well-known oscillator circuit. FIGS. 16 and 17 show an example of such an oscillator circuit, wherein the frequency sweeps.

In FIG. 17, a reference numeral 50 designates a power source, a reference numeral 53 denotes an integrator, and a reference numeral 54 represents a V/F converter. Fed to the integrator 53 are a frequency raising signal 51 and a frequency lowering signal 52, as shown in FIG. 16(*b*). By this arrangement, a signal having a frequency varying with respect to time is fed to a transistor 55, which drives a piezoelectric transducer 56 by means of a drive wave varying in frequency between $f_0$ and $f_1$ with respect to time as shown in FIG. 16(*a*).

An example of the present invention will be shown hereinunder.

When a printing head having a large difficulty in removing the air bubbles having entered into the nozzle was made to discharge the ink according to the conventional method, i.e., for 5 seconds at an ordinary temperature (25° C.), there was only 8% probability that the defective nozzle, which could not eject any ink droplets, was restored to normal. However, the probability of restoring the defective nozzle to normal was remarkably improved, i.e., 71% in the case where the heating operation was effected so that the nozzle was at 50°-60° C. and at the same time, the excitation operation was performed by applying to the piezoelectric transducer a sweep scan signal which makes one reciprocation between 1 KHz and 15 KHz in 10 seconds at a voltage less than one third of that in the normal printing operation. On the other hand, the restoring percentage was 37% in the case where no excitation operation was effected but only the heating operation was performed. The restoring percentage was 44% in the case where no heating operation was performed but only the excitation operation was effected.

In other words, it has been confirmed that the probability of restoring the defective nozzle to normal is remarkably improved by simultaneously carrying out both operations under proper conditions. It is to be noted that the reason why a voltage much lower than that in a normal printing operation is applied is that if a high voltage is applied, an air bubble is generated in the nozzle because of cavitation or the like. It is also noted that although in the above example the high-frequency power source 26 used for excitation was one generating a signal in the form of a pulse integrated by a given time constant (the rising time constant and the decaying time constant being different from each other), it is also possible to employ a high-frequency power source generating a sine-wave signal.

What is claimed is:

1. A method for removing air bubbles or solid impurities from a printing head of a drop-on-demand type ink jet printer, the method comprising:

(a) applying mechanical vibrations to the ink in said printing head when it is not in a printing state by generating a driving wave having a sweeping frequency with a driving circuit, (b) applying pressure to form a forced ink flow during the period of step (a) or subsequent thereto.

2. The method of claim 1, wherein the magnitude of the applied mechanical vibrations is less than a mechanical vibration applied to the inside of said pressure chamber during the printing operation.

3. The method of claim 2, wherein the magnitude of said mechanical vibration applied when said ink jet printer is not in a printing operation state is less than one third of the magnitude of the mechanical vibration applied during the printing operation.

4. The method of claim 1, wherein the nozzle surface of the printing head including the tip of said nozzle is covered with a liquid ink layer within the period of time including the whole of said mechanical vibrating step.

5. The method of claim 4, wherein the nozzle surface of the printing head including the tip of said nozzle is covered with a liquid ink layer having a thickness larger than the length of said nozzle within the period of time including the whole of said mechanical vibrating step.

6. The method of claim 1 further comprising a step of (c) applying heat to said printing head so that the temperature of the ink in said printing head is raised.

7. The method of claim 1, wherein said step of applying mechanical vibration includes using a driving circuit for generating a driving wave having pulse width, which is variable.

8. The method of claim 1, wherein said step of applying mechanical vibration includes using a driving circuit for generating a driving wave having a substantially rectangular wave shape.

9. The method of claim 1, wherein said step of applying mechanical vibration includes using a driving circuit for generating a driving wave having a sine-wave shape.

10. The method of claim 1, wherein the nozzle surface of the printing head including the tip of said nozzle is covered with a liquid ink layer within the period of time including the whole of said mechanical vibrating step.

11. The method of claim 10, wherein the magnitude of the applied mechanical vibrations is less than a mechanical vibration applied to the inside of said pressure chamber during the printing operation.

12. The method of claim 11, wherein the magnitude of said mechanical vibration applied when said ink jet printer is not in a printing operation state is less than one third of the mechanical vibration applied during the printing operation.

13. The method of claim 10, wherein the nozzle surface of the printing head including the tip of said nozzle is covered with a liquid ink layer having a thickness larger than the length of said nozzle within the period of time including the whole of said mechanical vibrating step.

14. The method of claim 1 further comprising a step of (c) applying heat to said printing head so that the temperature of the ink in said printing head is raised.

15. The method of claim 14, wherein the magnitude of the applied mechanical vibration is less than a mechanical vibration applied to the inside of said pressure chamber during the printing operation.

16. The method of claim 15, wherein the magnitude of said mechanical vibration applied when said ink jet printer is not in a printing operation state is less than one third of the magnitude of the mechanical vibration applied during the printing operation.

17. The method of claim 14, wherein the nozzle surface of the printing head including the tip of said nozzle is covered with a liquid ink layer within the period of time including the whole of said mechanical vibrating step.

18. The method of claim 17, wherein the nozzle surface of the printing head including the tip of said nozzle is covered with a liquid ink layer having a thickness larger than the length of said nozzle within the period of time including the whole of said mechanical vibrating step.

19. The method of claim 14, wherein said step of applying mechanical vibrations includes using a driving circuit for generating a driving wave having pulse width, which is variable.

20. The method of claim 14 wherein said step of applying mechanical vibrations includes using a driving circuit for generating a driving wave having a substantially rectangular wave shape.

21. The method of claim 14, wherein said step of applying mechanical vibrations includes using a driving circuit for generating a driving wave having a sine-wave shape.

22. The method of claim 14, including the step of discharging ink from the nozzle during and/or after the execution of the one of said two steps (a), (c) which finishes its operation later than the other.

23. The method of claim 14, wherein the period of executing step (a) at least partially overlaps the period of executing step (c).

24. The method of claim 1, wherein said step of applying mechanical vibrations includes energizing an electromechanical transducer means secured to said printing head.

25. The method of claim 1, wherein said step of applying mechanical vibrations includes energizing an electromechanical transducer means used for jetting out droplets during the printing operation.

26. The method of claim 1, wherein said step of applying mechanical vibrations includes energizing an electromechanical transducer means which is brought into contact with said printing head only when said mechanical vibrations are generated.

27. The method of claim 1, wherein said step of applying mechanical vibrations includes using a driving circuit for generating a driving wave having pulse width, which is variable.

28. The method of claim 1, wherein said step of applying mechanical vibrations includes using a driving circuit for generating a driving wave having a substantially rectangular wave shape.

29. The method of claim 28, wherein said step of applying mechanical vibration includes using a driving circuit for generating a driving wave having rising constant and decaying constant, at least one of which is variable.

30. The method of claim 1, wherein said step of applying mechanical vibration includes using a driving circuit for generating a driving wave having a sine-wave shape.

31. A method for removing air bubbles or solid impurities from a printing head of a drop-on-demand type ink jet printer, the method comprising:

(a) applying mechanical vibrations to the ink in said printing head when it is not in a printing state wherein the magnitude of the applied mechanical vibrations is less than a mechanical vibration applied to the inside of pressure chamber during the printing operation, (b) applying pressure to form a forced ink flow during the period of step (a) or subsequent thereto.

* * * * *